(12) United States Patent
Granat (10) Patent No.: US 8,963,528 B2
(45) Date of Patent: Feb. 24, 2015

(54) METHOD AND MEANS TO IMPLEMENT FIXED FREQUENCY OPERATION OF BUCK MODE SWITCHING

(75) Inventor: Stanley M. Granat, Baldwinsville, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 453 days.

(21) Appl. No.: 12/771,022

(22) Filed: Apr. 30, 2010

(65) Prior Publication Data

US 2011/0267020 A1    Nov. 3, 2011

(51) Int. Cl.
  *H02M 5/257*    (2006.01)
  *H02M 3/158*    (2006.01)

(52) U.S. Cl.
  CPC .......... *H02M 3/1588* (2013.01); *Y02B 70/1466* (2013.01)
  USPC .......................................... 323/284; 323/282

(58) Field of Classification Search
  USPC .................. 323/241, 259, 271, 273–274, 277, 323/280–284, 311–313, 224, 285, 318–322, 323/326, 349–351
  See application file for complete search history.

(56) References Cited

U.S. PATENT DOCUMENTS

| | | | |
|---|---|---|---|
| 4,118,673 A * | 10/1978 | Hafner | 331/2 |
| 4,709,323 A | 11/1987 | Lien | |
| 5,142,217 A * | 8/1992 | Gontowski, Jr. | 323/272 |
| 5,530,335 A | 6/1996 | Decker et al. | |
| 5,629,610 A * | 5/1997 | Pedrazzini et al. | 323/283 |
| 5,648,731 A | 7/1997 | Decker et al. | |
| 5,886,586 A * | 3/1999 | Lai et al. | 332/109 |
| 5,929,620 A * | 7/1999 | Dobkin et al. | 323/288 |
| 6,118,676 A | 9/2000 | Divan et al. | |
| 6,348,780 B1 * | 2/2002 | Grant | 323/222 |
| 6,587,356 B2 | 7/2003 | Zhu et al. | |
| 6,788,033 B2 | 9/2004 | Vinciarelli | |
| 7,023,187 B2 | 4/2006 | Shearon et al. | |
| 7,034,512 B2 * | 4/2006 | Xu et al. | 323/283 |
| 7,154,250 B2 | 12/2006 | Vinciarelli | |
| 7,183,757 B2 * | 2/2007 | Nagai | 323/285 |
| 7,382,114 B2 | 6/2008 | Groom | |
| 7,560,909 B2 | 7/2009 | Coleman | |
| 7,595,616 B2 * | 9/2009 | Prexl et al. | 323/280 |
| 7,596,006 B1 | 9/2009 | Granat | |
| 7,619,323 B2 | 11/2009 | Tan et al. | |
| 7,656,141 B1 | 2/2010 | Granat | |
| 7,714,547 B2 | 5/2010 | Fogg et al. | |
| 7,777,459 B2 | 8/2010 | Williams | |
| 7,782,027 B2 | 8/2010 | Williams | |
| 7,786,712 B2 | 8/2010 | Williams | |
| 7,821,238 B1 | 10/2010 | Li | |
| 7,889,524 B2 | 2/2011 | Lee et al. | |
| 8,008,902 B2 * | 8/2011 | Melanson et al. | 323/285 |
| 2005/0116699 A1 * | 6/2005 | Mazda | 323/283 |

(Continued)

FOREIGN PATENT DOCUMENTS

JP    03289214 A  * 12/1991

*Primary Examiner* — Adolf Berhane
*Assistant Examiner* — Henry Lee, III
(74) *Attorney, Agent, or Firm* — Howard IP Law Group, PC (57) ABSTRACT

A buck mode switching power supply under hysteretic control is provided. A fixed frequency pattern generator is operatively connected to the supply and configured to provide dynamic adjustment of the hysteretic threshold voltage level, resulting in the fixed frequency operation of the supply.

9 Claims, 12 Drawing Sheets

(56) References Cited

U.S. PATENT DOCUMENTS

| | | | |
|---|---|---|---|
| 2005/0225370 A1* | 10/2005 | Harms et al. | 327/175 |
| 2006/0012358 A1* | 1/2006 | Moussaoui | 323/282 |
| 2007/0182396 A1* | 8/2007 | Inatomi | 323/283 |
| 2009/0009148 A1* | 1/2009 | Philbrick | 323/282 |
| 2010/0013304 A1 | 1/2010 | Heineman | |
| 2010/0013305 A1 | 1/2010 | Heineman | |
| 2010/0013306 A1 | 1/2010 | Heineman et al. | |
| 2010/0013307 A1 | 1/2010 | Heineman et al. | |
| 2010/0123446 A1* | 5/2010 | Cheng et al. | 323/288 |
| 2010/0283322 A1 | 11/2010 | Wibben | |
| 2011/0006743 A1 | 1/2011 | Fabbro | |
| 2011/0043172 A1 | 2/2011 | Dearn | |

\* cited by examiner

# METHOD AND MEANS TO IMPLEMENT FIXED FREQUENCY OPERATION OF BUCK MODE SWITCHING

FIELD OF THE INVENTION

The present invention relates to power supplies, specifically to implementing fixed-frequency operation of a hysteretic current mode controlled buck mode power supply.

BACKGROUND

Switched mode power supplies rely on their control feedback loop response and passive component filtering to suppress input and output noise. Generally, these feedback loops have their bandwidths restricted to about one-fifth to one-tenth of the switching frequency as a result of component performance restrictions. Accordingly, their response to input voltage fluctuations is much slower than their switching frequency. This slow response is detrimental to performance, as many switched mode power supplies require faster response when current sharing, for example, when configured with multiple paralleled supplies.

To improve accuracy and response time, several forms of current mode control can be utilized to provide pulse by pulse current control. For example, hysteretic current mode control meets some of these requirements by implementing a fixed relationship between maximum, minimum, and average inductor currents on a pulse by pulse basis. This control method maintains a volt-sec. balance within the inductor during continuous conduction operation. However, the varying pulse width of the "on" and "off" timing of the power supply switching results in varying operating frequencies. This causes difficulties for system designers who require current sharing between multiple supplies as well as interleaved operation. Output ripple filtering is also negatively impacted as the operating frequency of this type of control varies over a wide range.

Alternate systems and methods of stabilizing the operating frequency of a switched mode power supply are desired.

SUMMARY

In one embodiment of the present invention, a switching power supply is provided with an input voltage. A pulse width modulator is operatively attached to the supply for providing hysteretic output current control. The pulse width modulator further comprises a fixed frequency pattern generator. The fixed frequency pattern generator is operatively connected to the power supply input voltage and configured to provide dynamic adjustment of the hysteretic threshold voltage, resulting in fixed switching frequency operation.

DETAILED DESCRIPTION OF PREFERRED EMBODIMENTS

Reference will now be made in detail to the present exemplary embodiments of the invention, examples of which are illustrated in the accompanying drawings.

Figure 1:
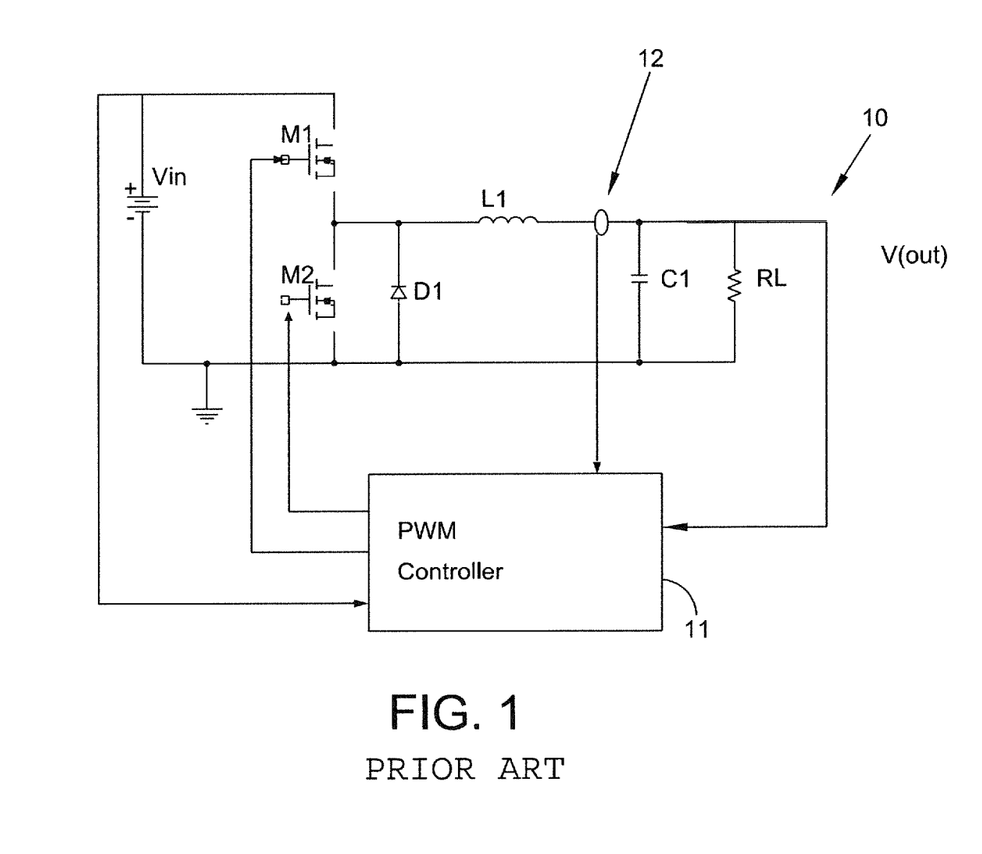
FIG. 1 is a circuit diagram of a basic buck mode power supply.

Referring generally to FIG. 1, the simplified operation of a basic buck mode supply under hysteretic current mode control according to the prior art will be described. The buck mode supply 10 includes transistors M1 and M2 operatively connected to a pulse width modulator (PWM) 11 configured to selectively couple an inductor L1 to an input voltage source V. Inductor current supplied to the load RL can be monitored by the PWM 11 at node 12 and controlled using, for example, an average current controller. One way to implement an average current controller with fast response is to use a hysteretic control approach which will be described herein with reference to FIGS. 2 and 3.

Figure 2:
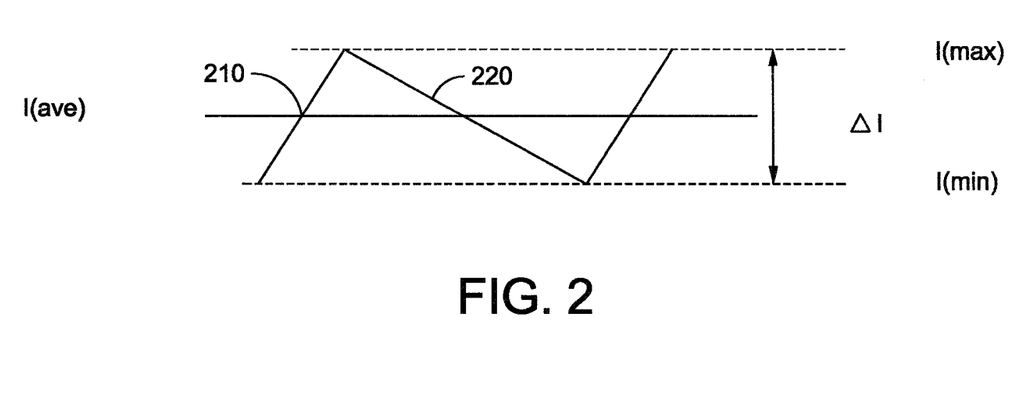
FIGS. 2 and 2a are plots showing current vs. time for the inductor shown in FIG. 1 under typical hysteretic mode control.

With reference to FIG. 2, a plot of measured inductor current vs. time is shown during hysteretic current mode control. The inductor current 210 ramps up in a generally linear fashion when the input voltage $V_{in}$ is applied. When the maximum predetermined threshold current level $I_{max}$ is reached, the PWM 11 disconnects the inductor L1 from the input voltage $V_{in}$, and the inductor L1 discharges to the load 220 in a generally linear fashion until it reaches a minimum current level $I_{min}$, ending a switching cycle. The switching cycle then repeats itself in the same fashion. As hysteretic current mode control "bounces" the inductor current between $I_{max}$ and $I_{min}$, by inference, the average current $I_{ave}$ is always half way therebetween. This method results in accurate average current production and fast transient responses (pulse by pulse basis) to changes in the input voltage $V_{in}$. While the above describes the general behavior of an inductor in a buck mode converter, a more detailed explanation is provided in Appendix 1 (below).

Figure 3:
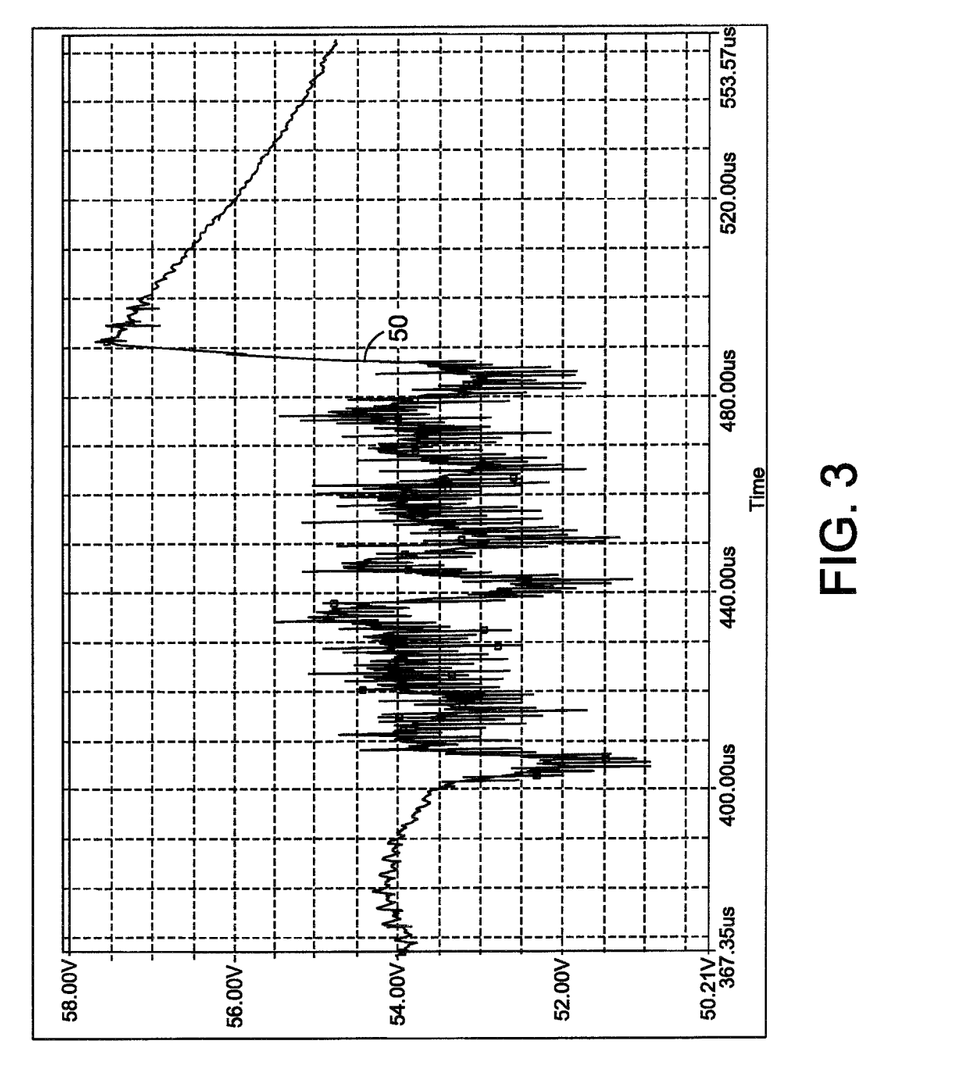
FIGS. 3 and 3a are plots of the input voltage and output voltage respectively of a buck mode supply under hysteretic control.
Figure 3A:
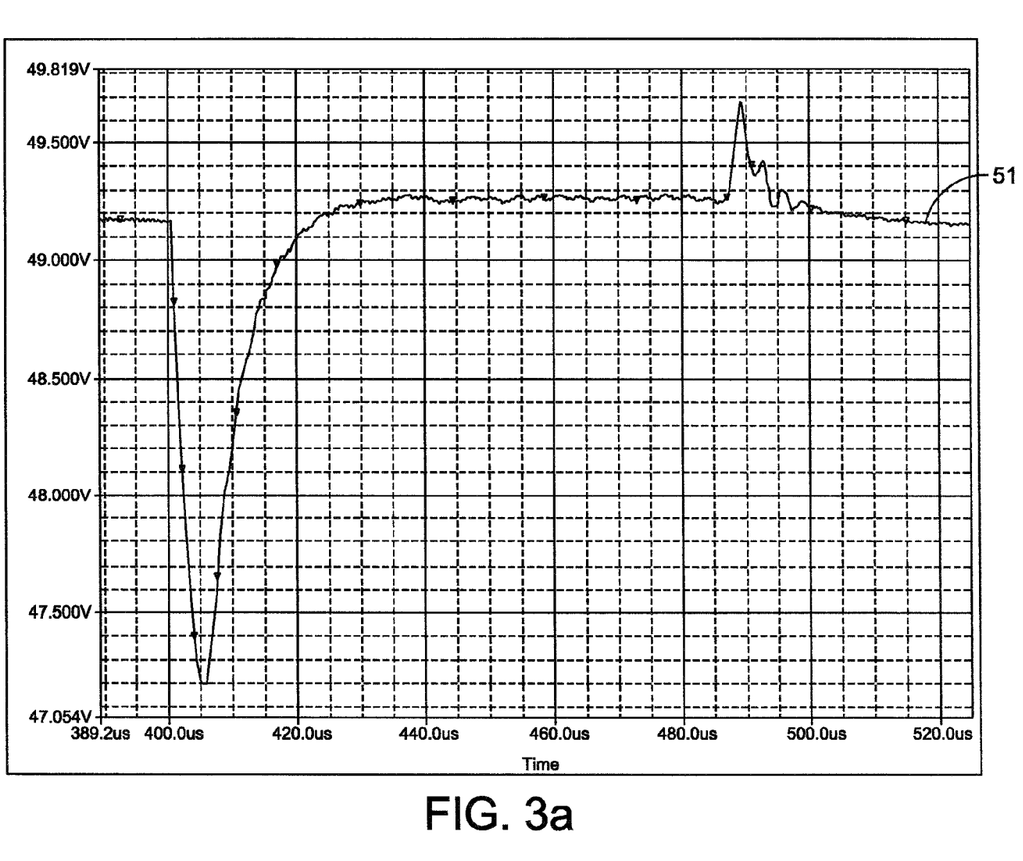

Hysteretic current mode control provides accurate average current production and beneficial noise-cancelling characteristics. For example, referring generally to FIGS. 3 and 3a, a relatively high level of noise is present in the input voltage 50 shown in FIG. 3, compared to the reduced noise level shown in the supply output 51 of FIG. 3a. However, the reduced noise characteristics come at the expense of fixed-frequency operation.

Figure 2A:
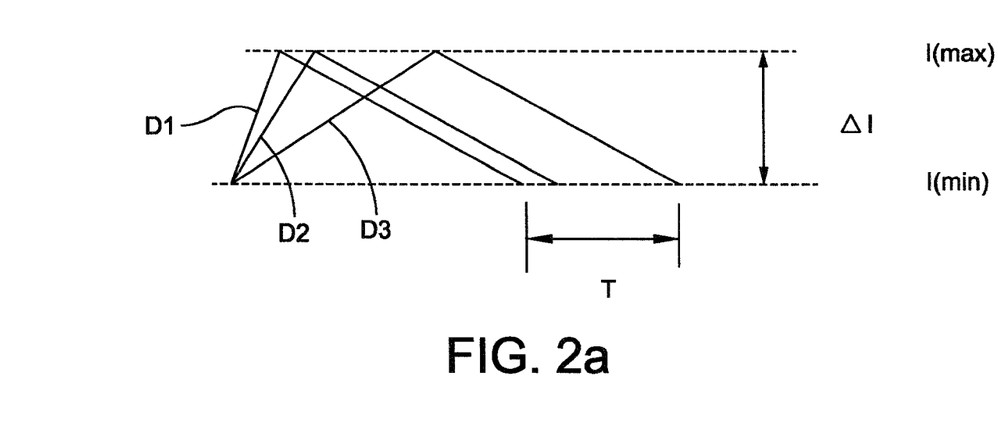

With reference to FIG. 2a, inductor current as a function of time is shown for a buck mode supply under hysteretic control, such as that described above with respect to FIG. 1. The voltage across an ideal inductor is related to the rate of change of current within the inductor. The varying initial positive slopes of traces D1, D2, and D3 represent fluctuations in input voltage levels. For example, if the input voltage is increased, the current rise time (and thus the inductor charging time) decreases. Trace D1 shows this decreased current rise time compared to a nominal input voltage and corresponding nominal voltage rise time in trace D2. Trace D3 represents a drop in input voltage, and thus a longer current ramp-up and a slower charging inductor. Because the discharge rates in traces D1, D2, and D3 are equal for a constant voltage output, variations in the input voltage produce variations in the cycle period T between the on and off timing of the power supply switches. Accordingly, the power supply constantly changes operating frequencies according to variations in the input voltage under hysteretic current mode control.

According to an aspect of the present invention, the hysteretic threshold window (defined by $I_{min}$ and $I_{max}$) is modified using a pattern synthesizer that maps a threshold window level to time in a manner which maintains the benefits of hysteretic current mode control, while providing for fixed frequency operation of the supply.

Figure 4:
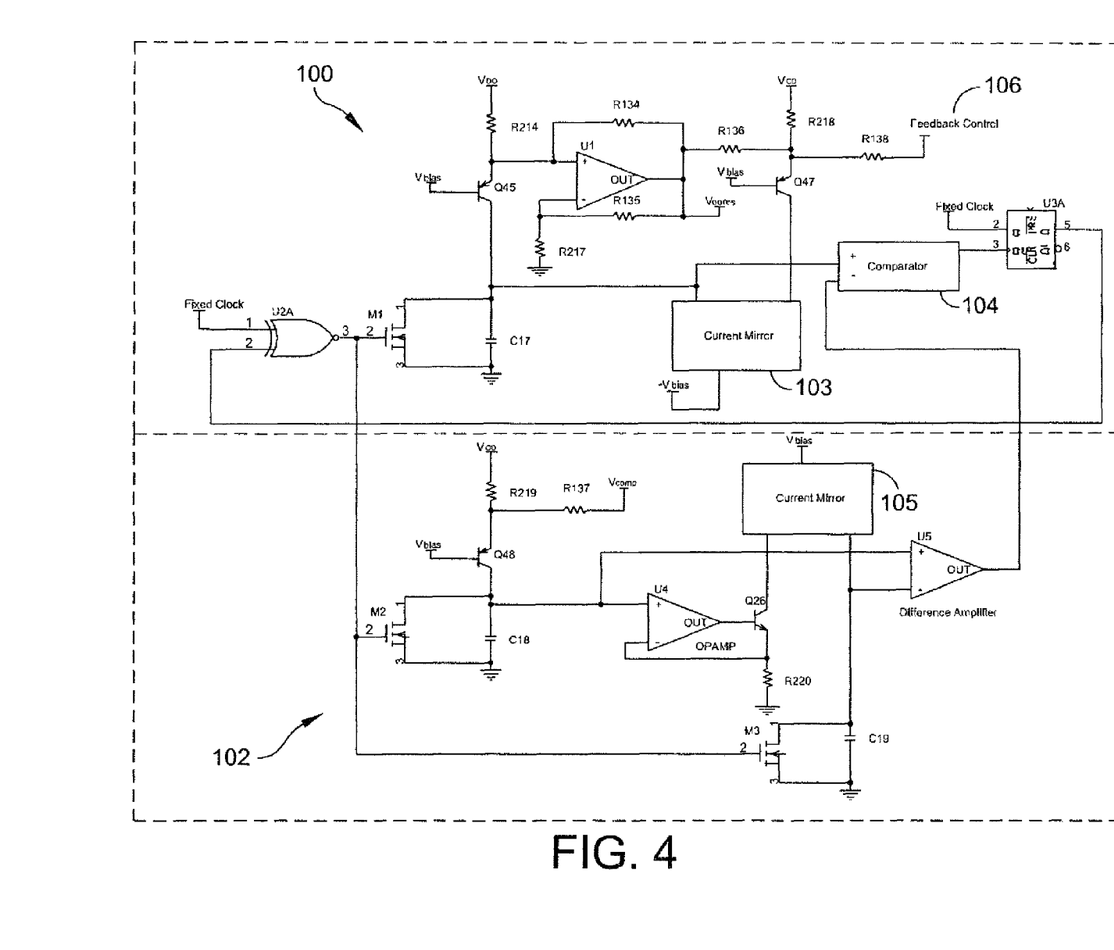
FIG. 4 is a circuit diagram illustrating a buck mode power supply and fixed frequency pattern generator accordingly to an embodiment of the present invention.

FIG. 4 shows a simplified buck mode supply 100 having a frequency pattern generator 102 operatively connected thereto. Of note, the buck mode supply 100 utilizes a capacitor C17 switchably connected to the input voltage source $V_{cc}$ which emulates the function of the inductor used and described above with respect to FIGS. 1 and 2. A more detailed explanation of this analogous structure is included below in Appendix 2.

In operation, exclusive OR gate U2A deactivates transistor M1 when a fixed clock level differs from the level output at terminal Q of latch U3A. With transistor M1 off, capacitor C17 voltage rises as it is charged by a current provided from the collector of common-base PNP transistor Q46. The current through transistor Q46 is created by converting a portion of the supply input voltage $V_{cc}$ into current using resistor R214.

The feedback control device 106 provides the duty control by reducing the current supplied by Q47. This feedback control circuit (not shown) consists of a conventional frequency compensated error amplifier with an output that is connected through a small signal diode. When the error voltage rises above $V_{bias}+V_{be}(Q47)+V_{diode}$, the diode forward-biases and conducts additional current into Q47 through resistor R138. This increases the current subtracted from the collector of transistor Q46 which reduces the charging current into capacitor C17, reducing the rate of voltage rise to threshold, increasing the duty cycle. The current through resistor R218 and through common-base PNP transistor Q47 is subtracted from the current flowing from the output of transistor Q46 after being copied by the negatively-biased current mirror 103. In this way, the minimum duty cycle can be set by controlling the ratio of resistor R218 to resistor R214. However, the value of resistor R218 must always be greater than the value of resistor R214 to ensure that capacitor C17 charges in the positive direction.

Because the output of the supply is the product of the input voltage and the duty cycle, controlling the duty cycle inherently compensates for the changes in the input voltage. However, feedback control loops are typically restricted to an operating bandwidth of less than one-half of the switching frequency, with typical values limited to about one-tenth to one-fifth of the switching frequency. This slower response results in a loss of correction control for input voltage fluctuations at frequencies higher than the bandwidth of the feedback control. Accordingly, the pulse by pulse operation of hysteretic current mode control provides an added benefit over these standard feedback control loops.

Under hysteretic control, when the voltage at capacitor C17 reaches the threshold level supplied to the comparator, the comparator strobes the clock line of latch U3A. A remote strobe to latch U3A will override a timing cycle and provide alternative duty cycle limiting to the standard feedback control. The logic present at the "D" input of latch U3A is latched to the Q terminal output of latch U3A. This logic level is that of the input clock line U2A which then switches transistor M1 "on", shorting capacitor C17 to reference potential (ground) in preparation for the start of the next switching cycle.

If the input voltage $V_{cc}$ exhibits a positive noise voltage spike, capacitor C17 will charge to a threshold level in a shorter time interval compared to the charging time at a nominal input voltage level. Thus, the duty cycle of the current controller will decrease in order to maintain an equivalent volt-sec. setting of the threshold level, independent of the feedback control loop. The result is a direct reduction of the input sourced noise modulation of the output voltage, thereby expanding the frequency range for input to output noise isolation independent of the feedback control loop bandwidth restrictions described above. The drawback of this arrangement is the frequency variation as described above with respect to FIG. 2. This variation in operating frequency is problematic when coupling several converters together to implement output current sharing and reduced output voltage ripple created by the inductor charging and discharging into the output capacitors.

However, if the threshold hysteretic voltage level is configured to vary with time, then operating frequency variation can be stabilized. Specifically, the switching period T changes as a function of the reciprocal of the input voltage $V_{cc}$ and the duty cycle D such that switching period $T=RC(\Delta V)/[(VccD)(1-D)]$ (a detailed derivation of this relationship is provided in Appendix 3). This relationship prevents the operation of the hysteretic current mode control at a fixed frequency because R, C, and the voltage threshold $\Delta V$ are generally held constant. However, if the voltage threshold $\Delta V$ can be changed dynamically, switching period T can be held constant independent of changes in the input voltage $V_{cc}$ and duty cycle D.

As described in greater detail in Appendix 4 (below), the switching period T changes as a function of $1/[(VccD)(1-D)]$. This relationship can be synthesized by an appropriate circuit to generate a dynamic threshold voltage level used to achieve fixed frequency operation. Specifically, if a current proportional to the supply input voltage $V_{cc}$ is integrated in a first capacitor, the resulting voltage converted to a current and integrated in a second capacitor, the difference between these first and second integrals provides the reference function needed for fixed frequency operation of the supply.

These operations are implemented into the pattern generator 102 of FIG. 4 using two cascaded gated integrators. The first integrator is comprised of a resistor R219, transistor Q48, capacitor C18 and discharge transistor M2. Resistor R219 and common-base transistor Q48 operate to convert a voltage proportional to the supply input voltage $V_{cc}$ to a current which integrates in capacitor C18 when transistor M2 opens the circuit. Amplifier U4 buffers the voltage output of the capacitor C18 and generates a current via transistor Q26, resistor R220, and current mirror 105, which charges the second integrating capacitor C19. Transistor M3 supplies a reset function for the second integrator. Both transistors M2, M3 are switched at the same time as capacitor C17, so all integrals rise from near zero volts simultaneously. The voltage difference between the integrators C18 and C19 is generated by a difference amplifier U5 and is supplied to the comparator 104 as the reference threshold voltage $\Delta V$.

Figure 5:
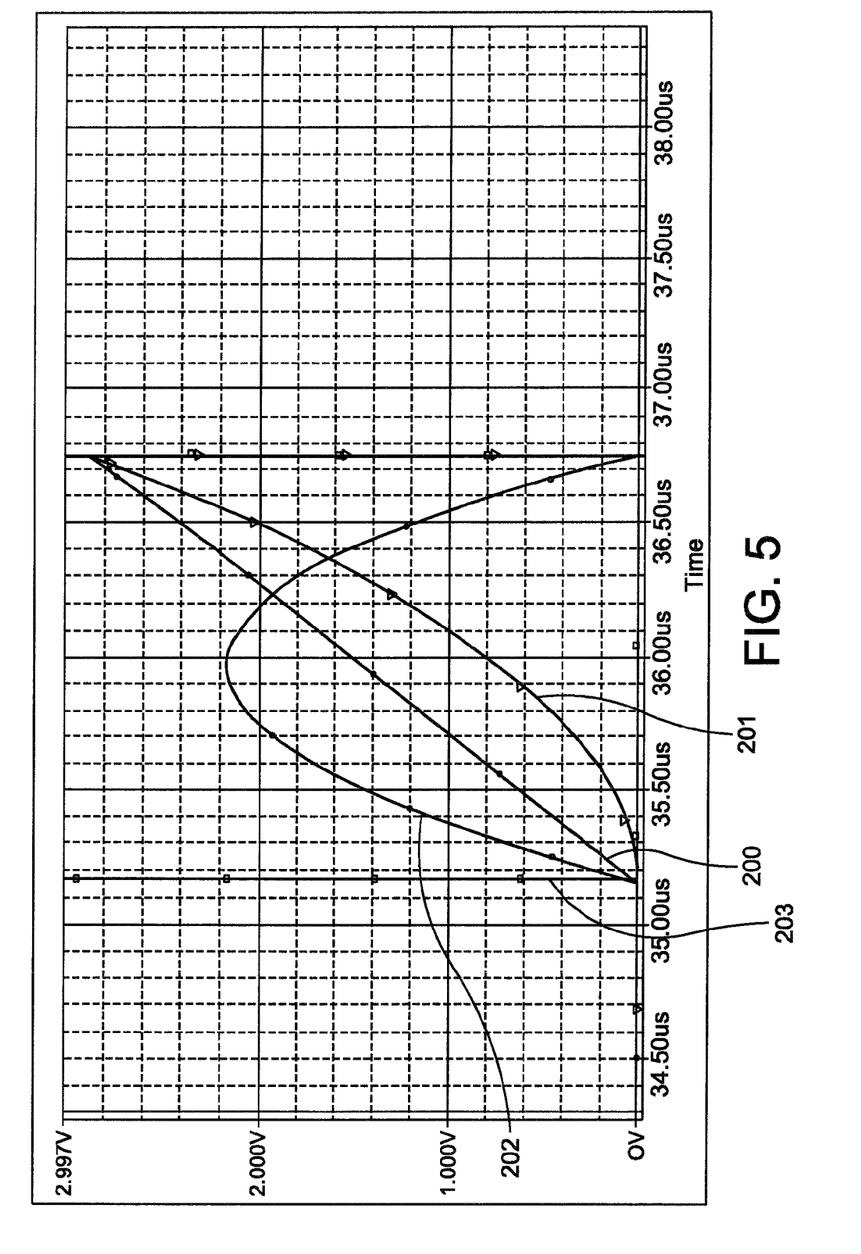
FIG. 5 is a plot of the supply input voltage integrated over a first and second capacitor, and a waveform generated from the difference between the two integrations.

The wave forms resulting from the integrators and the difference amplifier are shown in FIG. 5. Trace 203 indicates the gate drive of transistors M1, M2 and M3 (note all operate simultaneously). The first trace 200 represents the output voltage of the first integrating capacitor C18. The second trace 201 represents the voltage generated by the second integrating capacitor C19. The third parabolic trace 202 represents the difference between the two integration voltages. This function is the adjusted threshold voltage that will be applied to the comparator 104 to maintain fixed frequency operation.

Figure 6:
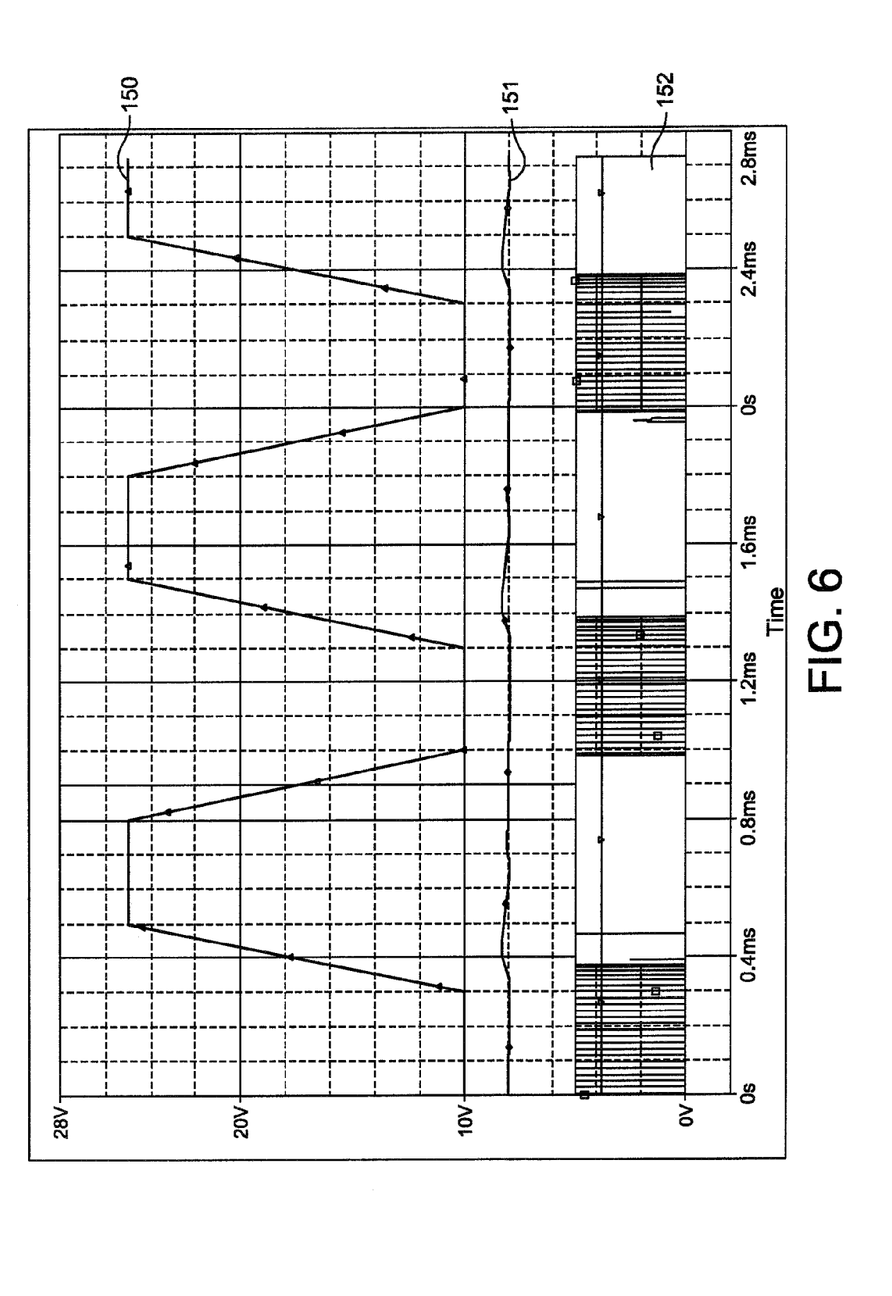
FIGS. 6 and 6a are plots showing a simulation of a buck mode power supply operating without the pattern generator of the present invention and with the pattern generator, respectively.
Figure 6A:
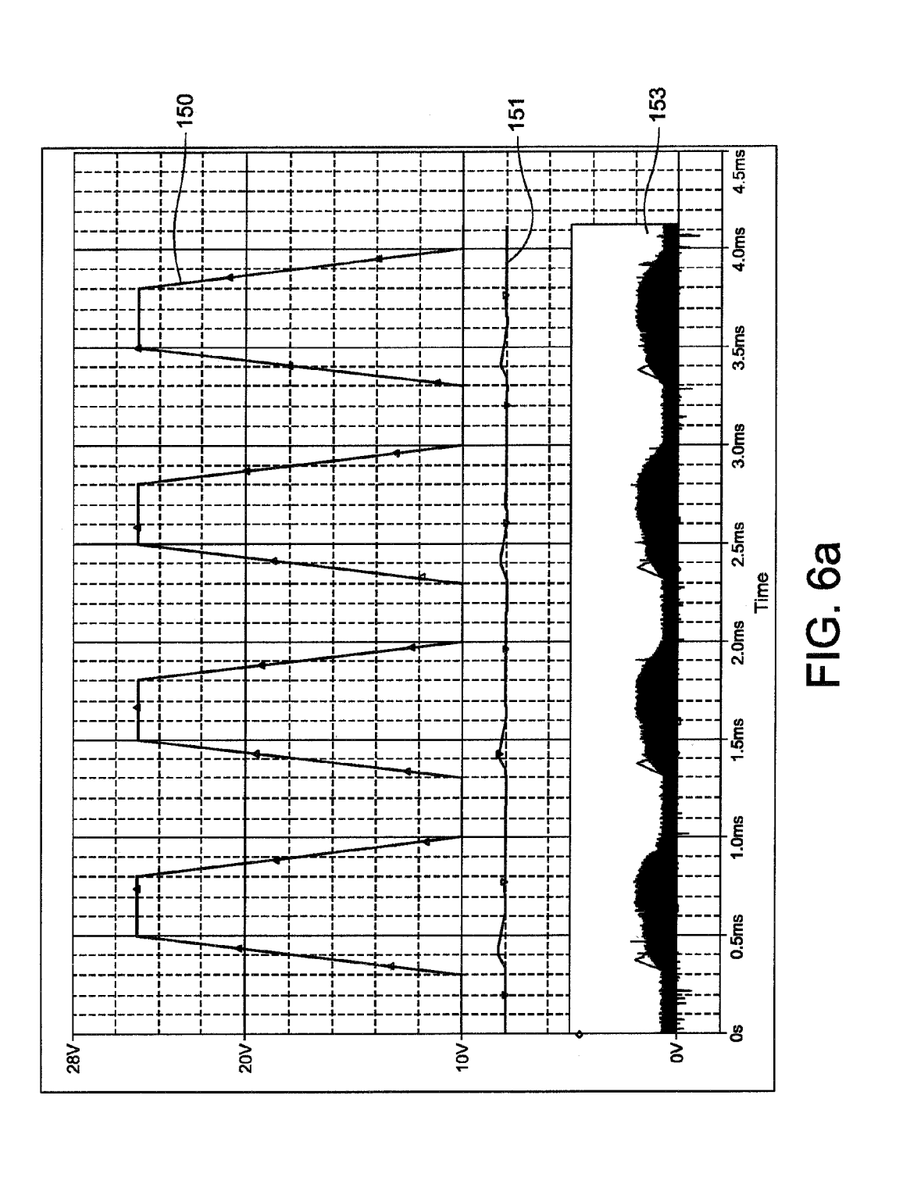

FIG. 6 contains simulated plots of the input voltage 150, regulated output voltage 151 and the gate drive signal to the switched mode converter FET 152. The hysteresis level is fixed in FIG. 6 to demonstrate the wide variation in operating frequency. FIG. 6a contains simulated plots of the input voltage 150, the regulated output voltage 151 and gate drive signal to the switched mode converter FET 153. The hysteresis level is controlled by the pattern generator in FIG. 6a and indicates a more consistent operating frequency in the gate drive signal 153. FIG. 6 frequency deviation spans +56% to −76% of average frequency. FIG. 6a shows a frequency deviation of +7.9% to −12.3% of average frequency.

Figure 7:
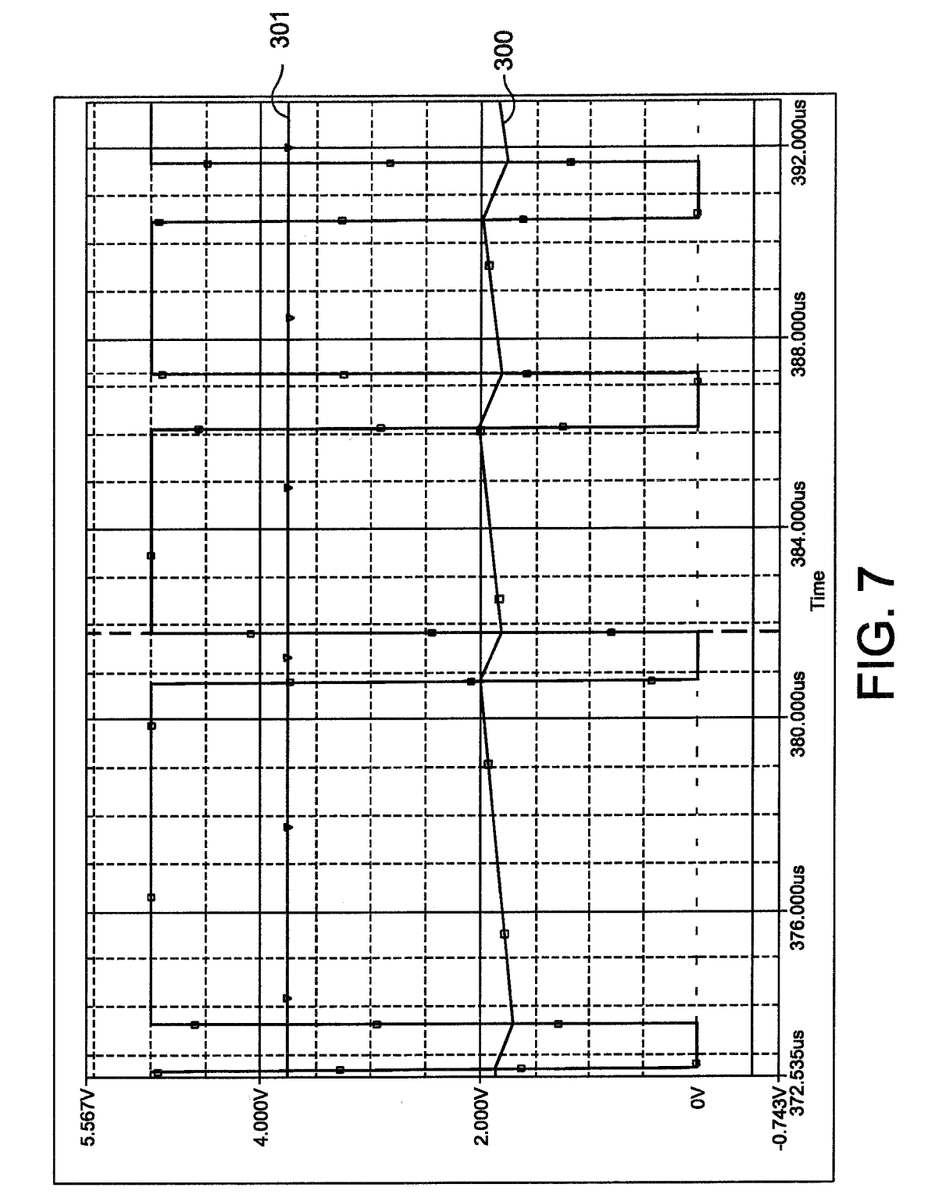
FIGS. 7 and 7a are plots showing a simulation of a buck mode power supply having a positive ramping input voltage operating without the pattern generator of the present invention, and with the pattern generator, respectively.
Figure 7A:
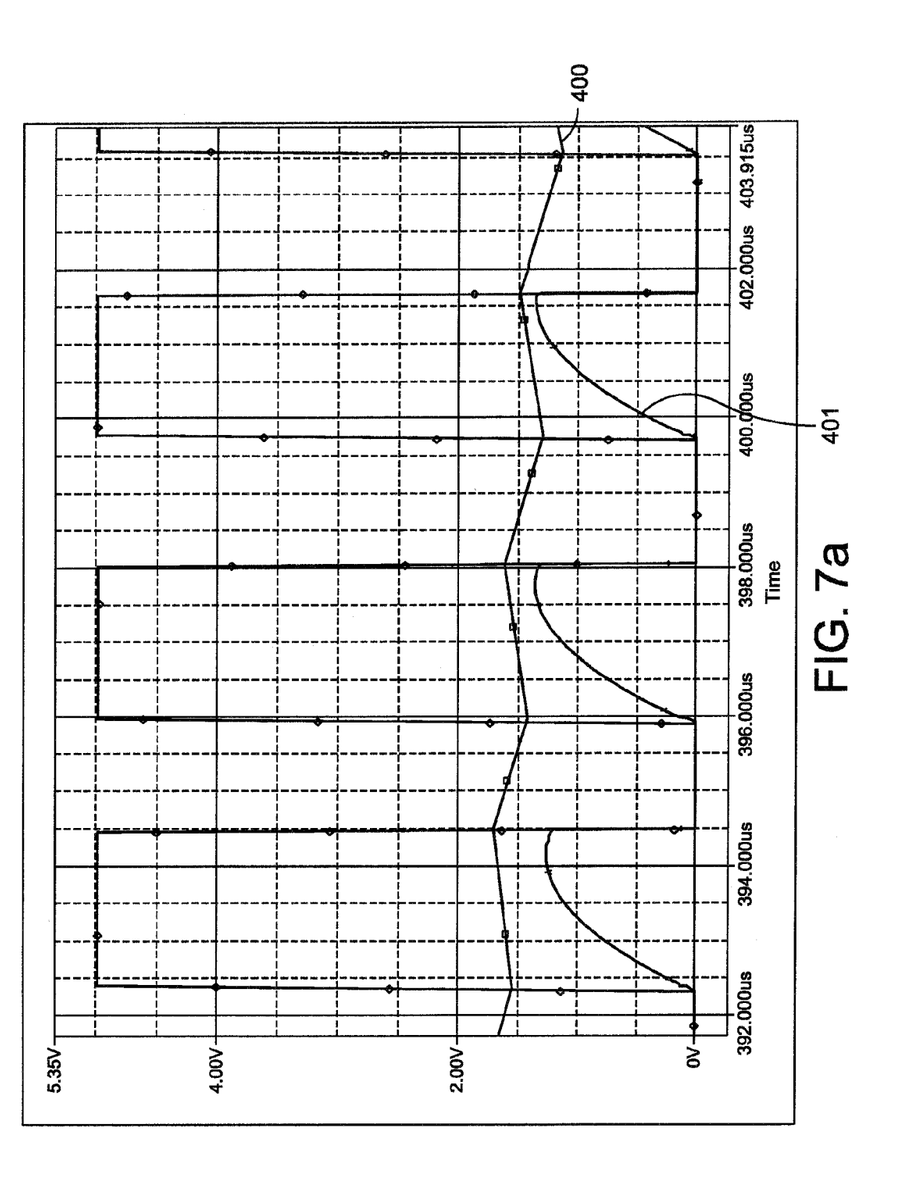
Figure 8:
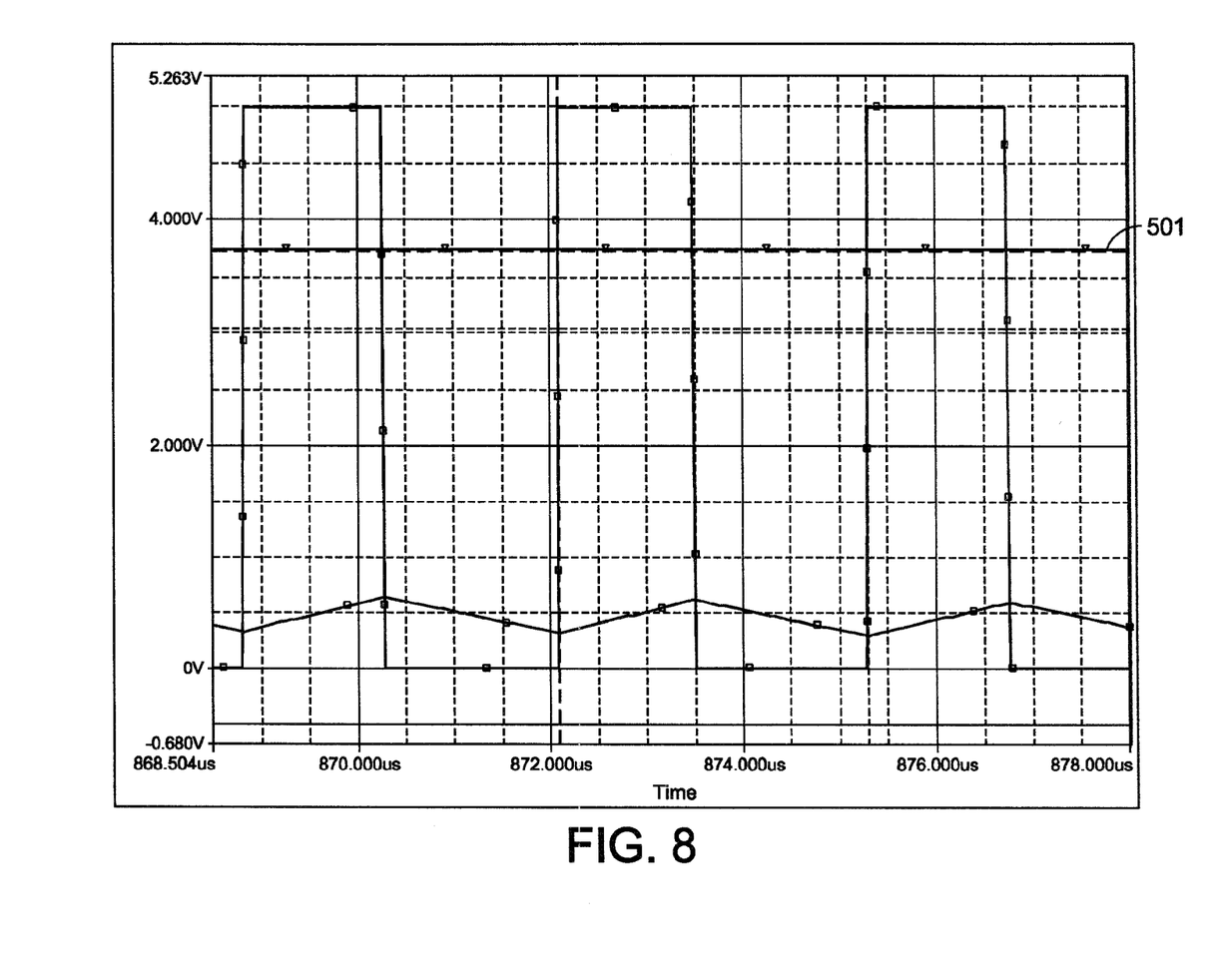
FIGS. 8 and 8a are plots showing a simulation of a buck mode power supply having a negative ramping input voltage operating without the pattern generator of the present invention, and with the pattern generator, respectively.
Figure 8A:
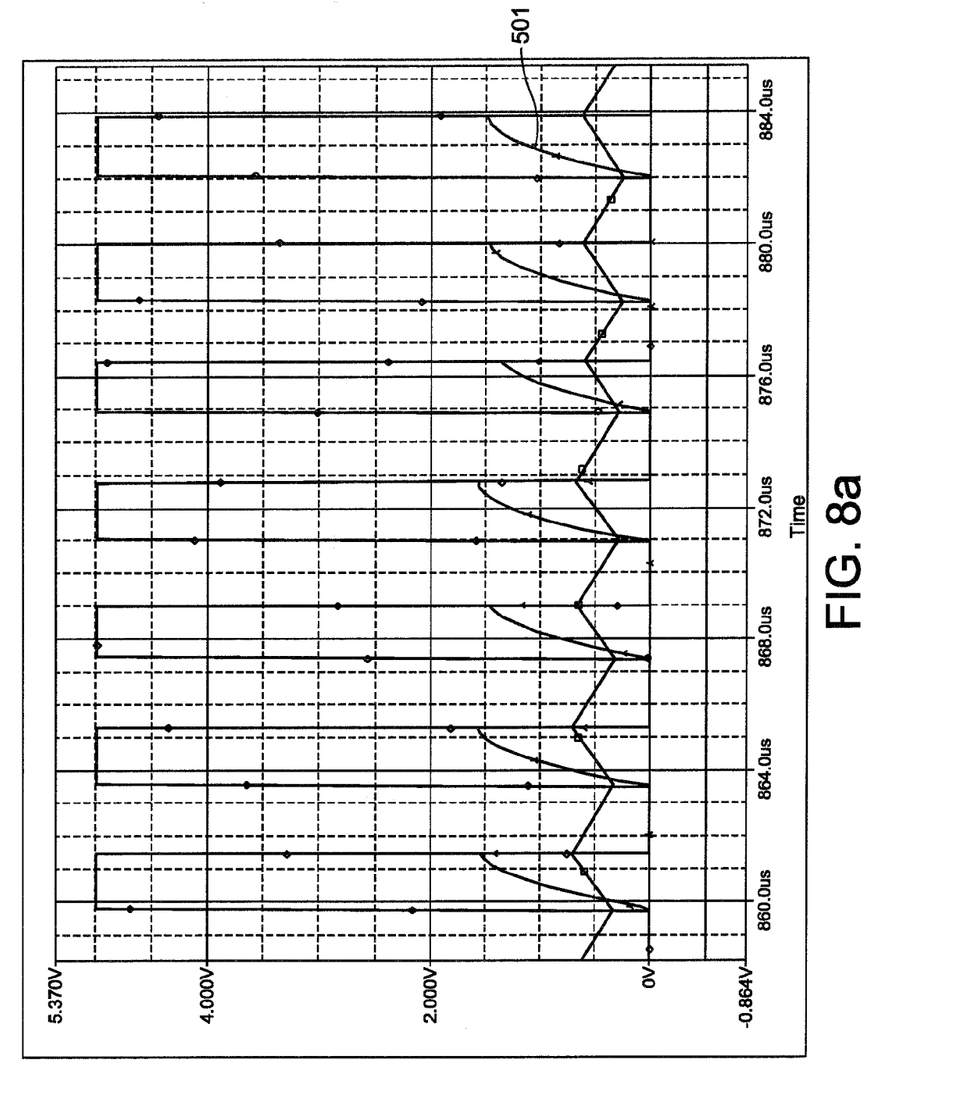

FIGS. 7 and 7a show an enlarged view of sections of FIGS. 6 and 6a respectively. These operating frequency changes become visible in inductor current traces 300, 400. Specifically, FIG. 7 shows a plot of the output inductor current 300 as a function of time with a ramping input voltage. As discussed above with respect to FIG. 2a, with a fixed hysteretic reference level 301, as the input voltage increases, a faster current rise time is expected, followed by constant discharging times. This decreasing switching period is reflected in the saw tooth current trace 300. Note the decreasing switching period as the input voltage increases. The supply generating the current output shown in FIG. 7a however, utilizes the fixed frequency pattern generator to provide varying comparator threshold waveforms 401, rather than the fixed hysteretic reference 301 shown in FIG. 7. The output current trace 400 now features a consistent switching period despite the ramping input voltage. Note the continually rising peaks of threshold waveforms 401 generated to compensate for this rise in input voltage. The threshold level must increase to produce the same switching period given the increasing input voltage. FIGS. 8 and 8a show similar behavior of the threshold wave forms 501, as they are altered on a pulse by pulse basis to compensate for the fluctuating input voltage.

The following Appendices describe the operating environment of a buck mode power supply useful for explaining the concepts of the present invention. Specifically, the Appendices provide a detailed analysis of the operation of an inductor and an equivalent capacitor in a buck mode supply, the analysis and derivation of a function representing the variation in switching frequency of a buck mode power supply, and the implementation of this function into the pattern generator used to provided the fixed frequency operation.

Appendix 1: Operating Environment of a Buck Mode Inductor

The voltage across an ideal inductor is related to the rate of change of current within the inductor by:

$$V(ind) = -Lx(\partial I/\partial t).$$

The voltage across the buck mode inductor during the pulse width interval, ignoring switch voltage drops, is Vcc−Vo. Thus, the above expression becomes:

$$(Vcc-Vo) = -Lx(\partial I/\partial t).$$

Multiplying both sides through by at and integrating yields:

$$\int_0^{tp} (Vcc - Vo)\partial t = -L \int_{Imin}^{Imax} \partial I = -L(Imax - Imin) = -L(\Delta I)$$

For (Imax−Imin) defined as ΔI, −L(Imax−Imin)=−LΔI. During the next time interval from tp to T, the inductor current discharges to maintain the voltage across the inductor. The voltage across the buck mode inductor during discharge, ignoring switch voltage drops, is −Vo.

$$\int_{tp}^{T} (0 - Vo)\partial t = -L \int_{Imax}^{Imin} \partial I = -L(Imin - Imax) = -L(-\Delta I).$$

During continuous conduction mode operation, the inductor starts at $I_{min}$, ramps up to $I_{max}$, and returns to $I_{min}$ at the end of a switching cycle. Summing these two expressions over a cycle yields the same ΔI magnitudes which cancel:

$$\int_0^{tp} (Vcc - Vo)\partial t + \int_{tp}^{T} (0 - Vo)\partial t = 0$$

Evaluation of this expression, assuming that the average voltages during a cycle remain constant, yields:

(Vcc−Vo)(tp−0)+(−Vo)(T−tp)=0

Vcc(tp)−Vo(tp)+(−Vo(T)+Vo(tp))=0

Vcc(tp)−<u>Vo(tp)</u>−Vo(T)+<u>Vo(tp)</u>=0

Note that the two underlined terms cancel, leaving:

Vcc(tp)−Vo(T)=0 or

Vcc(tp)=Vo(T) which rearranges to Vcc(tp/T)=Vo.

Defining D, the duty cycle, as (tp/T)=D, the equation for an idealized buck mode transfer function emerges: D(Vcc)=Vo.

Appendix 2: Analogous Structure Emulating an Inductor

The current and voltage relationship in a capacitor can emulate the current and voltage relationship in an inductor. V(ind)=−L(∂I/∂t) is analogous to I(cap)=C(∂V/∂t). Multiplying through by at and integrating both sides yields:

$$\int_0^{tp} I(cap)\partial t = C \int_{Vmin}^{Vmax} \partial V = C(Vmax - Vmin) = C(\Delta V).$$

For (Vmax−Vmin) defined as ΔV, C(Vmax−Vmin)=CΔV. If one configures the circuit to furnish I(cap)=(Ia−Ib), the equations take the form of the inductor equations in Appendix A:

$$\int_0^{tp} (Ia - Ib)\partial t = C \int_{Vmin}^{Vmax} \partial V = C(Vmax - Vmin) = C(\Delta V).$$

During the next time interval from tp to T, the capacitor can discharge via −Ib to complete the cycle:

$$\int_{tp}^{T} (0-Ib)\partial t = C\int_{Vmax}^{Vmin} \partial V = C(Vmin - Vmax) = C(-\Delta V).$$

During continuous conduction mode operation, the capacitor starts at Vmin, ramps up to Vmax, and returns to Vmin at the end of a switching cycle. Summing these two expressions over a cycle yields the same $\Delta V$ magnitudes which cancel:

$$\int_{0}^{tp} (Ia-Ib)\partial t + \int_{tp}^{T} (0-Ib)\partial t = 0$$

Evaluation of this expression yields:

$(Ia-Ib)(tp-0)+(-Ib)(T-tp)=0$ $Ia(tp)-Ib(tp)+(-Ib(T)+Ib(tp))=0$ $Ia(tp)-\underline{Ib(tp)}-Ib(T)+\underline{Ib(tp)}=0$ Note that the two underlined terms cancel, leaving:

$Ia(tp)-Ib(T)=0$ or $Ia(tp)=Ib(T)$ which rearranges to $Ia(tp/T)=Ib$.

Substituting $(tp/T)=D$, the duty cycle, the equation for an idealized emulated buck mode transfer function emerges:

$D(Ia)=Ib$.

If circuitry is configured to supply current Ia proportional to Vcc, and Ib proportional to Vo, then the capacitor circuit emulates the inductor environment during operation in a switching converter operating in buck mode during continuous conduction.

Appendix 3: Variation of Switching Frequency During Hysteretic, Continuous Conduction Mode Operation Substituting the voltage terms into the equation:

$$\int_{0}^{tp} (Ia-Ib)\partial t = C(\Delta V).$$

and $$\int_{tp}^{T} (0-Ib)\partial t = C(-\Delta V).$$

Substituting the voltage terms into the equation transforms it to:

$$\int_{0}^{tp} \{(Vcc/Ra)-(Vo/Rb)\}\partial t = C(\Delta V) = \{(Vcc/Ra)-(Vo/Rb)\}(tp-o)$$

and $$\int_{tp}^{T} \{0-(Vo/Rb)\}\partial t = C(-\Delta V) = \{0-(Vo/Rb)\}(T-tp)$$

The switching frequency period is $T=1/f(sw)$, with T in seconds and $f(sw)$ in Hertz. T comprises the first time interval when the inductor stores energy (0 to tp) and the second time interval when the inductor discharges the stored energy to the load when the top side buck switch disconnects from the source voltage (T-tp). Making these substitutions sets t(charge)=tc=(tp-0) and t(discharge)=td=(T-tp). Incorporating this into the above equations yields:

$\{(Vcc/Ra)-(Vo/Rb)\}(tp-o)=C(\Delta V)$ transforms to $\{(Vcc/Ra)-(Vo/Rb)\}(tc)=C(\Delta V)$ $\{0-(Vo/Rb)\}(T-tp)=C(-\Delta V)$ transforms to $\{0-(Vo/Rb)\}(td)=C(-\Delta V)$ Rearranging these two equations to solve for time:

$tc=C(\Delta V)/\{(Vcc/Ra)-(Vo/Rb)\}$ and $td=C(-\Delta V)/(-Vo/Rb)=C(\Delta V)/(Vo/Rb)$ The sum of these two time intervals equals the switching period, T:

$T=tc+td=C(\Delta V)/\{(Vcc/Ra)-(Vo/Rb)\}+C(\Delta V)/(Vo/Rb)$
$=C(\Delta V)[(1/\{(Vcc/Ra)-(Vo/Rb)\})+(1/(Vo/Rb))]$ Rearranging the portion of the equation between the [ ] brackets yields:

$$\left(\frac{Vo}{Rb}+\frac{Vcc}{Ra}-\frac{Vo}{Rb}\right)\Big/\left(\frac{Vo}{Rb}\right)\left(\frac{Vcc}{Ra}-\frac{Vo}{Rb}\right)$$

Simplify by setting Ra=Rb=R:

$$\left(\frac{Vo}{R}+\frac{Vcc}{R}-\frac{Vo}{R}\right)\Big/\left(\frac{Vo}{R}\right)\left(\frac{Vcc}{R}-\frac{Vo}{R}\right)$$

$(1/R)(Vo+Vcc-Vo)/(1/R^2)(Vo)(Vcc-Vo)$

Multiplying through by $(R^2/R^2)$ simplifies the expression to:

$[R(Vcc)/\{(Vo)(Vcc-Vo)\}]$

Restoring this to the equation for switching period produces:

$T=tc+td=C(\Delta V)[R(Vcc)/\{(Vo)(Vcc-Vo)\}]$

Incorporating the relationship between Vo and Vcc, Vo=DVcc, for the buck regulator:

$T=tc+td=RC(\Delta V)[(Vcc)/\{(DVcc)(Vcc-(DVcc))\}]$

Multiplying through by (1/Vcc)/(1/Vcc) simplifies the expression to:

$T=RC(\Delta V)[1/\{(VccD)(1-D)\}]$

Examination of this equation indicates that the switching period changes with the reciprocal of Vcc as well as D. This prevents the operation of a hysteretic mode PWM switched mode converter at constant frequency since R, C and $\Delta V$ are usually held constant. However, if $\Delta V$ can be changed on a dynamic basis to compensate for the influence of Vcc and D then this expression would reduce to T=KRC where K is also a constant. In that case, the switching period, T, could remain constant independent of changes in Vcc and D.

Appendix 4: Computational Synthesis of Vcc(D)(1−D)

An objective of this implementation to supply information to the PWM controller in the shortest time possible to support fast transient response. This can be accomplished if the calculations for D occur as capacitor charging time (tc)

progresses (i.e. during the energy storage portion of the switching cycle, (0–tp). However, in this case, expanding the parenthesis yields:

Vcc(D)(1−D)=Vcc(D−(D^2)) which requires subtraction between D terms instead of multiplication. If a current proportional to Vcc is integrated in a capacitor:

$$\int_0^{tp} I(\text{cap})\partial t = C \int_{Vmin}^{Vmax} \partial V = C(Vmax - Vmin) = C(\Delta V).$$

Defining (ΔV)=V1 and I(cap)=Vcc/R1:

$$\int_0^{tp} (Vcc/R1)\partial t = C1(V1) \text{ or } (1/R1C1)\int_0^{tp} Vcc\partial t = V1$$

If Vcc is relatively constant over the tp interval, the expression becomes: tp(Vcc/R1C1)=V1. If V1 is converted to a current (i.e. V1/R2=I(cap2)) and integrated in a second capacitor, a second voltage, V2, is generated during (0–tp):

$$\int_0^{tp} (V1/R2)\partial t = C2(V2) \text{ or } (1/R2C2)\int_0^{tp} V1\partial t = V2$$

Substituting the time varying value of V1=tp(Vcc/R1C1) =t(Vcc/R1C1) changes the characteristics of the second integration:

$$(1/R2C2)\int_0^{tp} (Vcc/R1C1)t\partial t = V2 \text{ or } (Vcc/(R1C1)(R2C2))\int_0^{tp} t\partial t = V2$$

The integral of tdt equates to the integral of (½)d(t^2), thus V2 becomes:

[Vcc/{2(R1C1)(R2C2)}](tp^2)=V2.

Subtracting V2 from V1:

V1−V2=(Vcc/R1C1)tp−[Vcc/{2(R1C1)(R2C2)}](tp^2)

Grouping Vcc/R1C1 yields:

V1−V2=(Vcc/R1C1)[tp−(tp^2)/(2R2C2)]

Extracting tp yields:

V1−V2=(1/R1C1)Vcc(tp)[1−(tp/2R2C2)]

Substituting the relationship between input and output voltage for buck mode operation (tp=DT) yields:

V1−V2=[VccDT/(R1C1)]{1−(DT/2R2C2)}

Defining 2R2C2=T and R1C1=(T/K) where K is a constant and substituting in the above equation produces:

V1−V2=[VccDT/(T/K)]{1−(DT/(T)} or [KVccD]{1−D}.

If this is substituted for ΔV in the following equation for T of a continuous conduction hysteretic buck mode controller (refer to Appendix C):

T=RC(ΔV)[1/{(VccD)(1−D)}]

The equation transforms to:

T=RC[KVccD{1−D}]/{VccD(1−D)}.

Note that the VccD(1−D) terms in the numerator equal that of the denominator. The ratio equates to one leaving the desired transfer function of T=KRC which is constant. This computation can be implemented by using two cascaded gated integrators and simply subtracting the output of one from the other.

While the foregoing describes exemplary embodiments and implementations, it will be apparent to those skilled in the art that various modifications and variations can be made to the present invention without departing from the spirit and scope of the invention.

What is claimed is:

1. A switching power supply comprising:
   at least one power converter stage provided with an input voltage source;
   a current controller; and
   an open loop, feed forward fixed frequency pattern generator operatively connected to the current controller, the pattern generator comprising:
      a first integrator operatively connected to the input voltage source;
      a second integrator; and
      a differential amplifier configured to output the difference between the output of the first and second integrators,
   wherein the output of the differential amplifier is provided to the current controller for use as a threshold voltage level for maintaining fixed frequency operation of the supply independent of changes in the input voltage source.

2. The switching power supply of claim 1, wherein the current controller comprises a hysteretic current controller.

3. The switching power supply of claim 1, wherein the fixed frequency pattern generator is operatively connected to the input voltage source.

4. The switching power supply of claim 1, wherein the fixed frequency pattern generator further comprises an operational amplifier arranged between the first and second integrators configured to buffer the output of the first integrator.

5. The switching power supply of claim 4, wherein the first integrator comprises a resistor arranged between the input voltage source and a first capacitor, the resistor configured to convert the input voltage signal to a current signal that integrates in the first capacitor.

6. The switching power supply of claim 5, wherein the first integrator further comprises a first transistor arranged between the resistor and the first capacitor, the first transistor configured to control the flow of current to the capacitor.

7. A switching power supply comprising:
   at least one power converter stage provided with an input voltage source;
   a current controller; and
   a fixed frequency pattern generator operatively connected to the current controller comprising,
      a first integrator operatively connected to the input voltage source;
      a second integrator; and
      a differential amplifier configured to output the difference between the output of the first and second integrators to the current controller,
   wherein the fixed frequency pattern generator generates a threshold voltage level used by the current controller to maintain fixed frequency operation of the supply independent of changes in the input voltage source, and
   wherein the second integrator comprises a second transistor coupled to the output terminal of the operational amplifier, the second transistor coupled to a current mirror and configured to supply a second integrating capacitor with a current proportional to the output of the first integrator.

8. A method for implementing fixed frequency operation of a hysteretic current controlled, switching power supply comprising the steps of:
    controlling the output current of the power supply using a hysteretic current controller;
    generating a fixed frequency function using an open loop pattern generator including:
        integrating the input voltage to the power supply in a first capacitor;
        integrating the output of the first capacitor; and
        subtracting the output of the integrations; and
    continuously altering a hysteretic voltage threshold value used by the hysteretic current controller according to the fixed frequency function to provide for fixed frequency operation of the supply independent of changes in an input voltage to the power supply.

9. A method for implementing fixed frequency operation of a hysteretic current controlled, switching power supply comprising the steps of:
    generating a fixed frequency function by:
        integrating an input voltage to the power supply in a first capacitor;
        integrating the output of the first capacitor; and
        subtracting the output of the integrations,
    controlling the output current of the power supply using a hysteretic current controller;
    continuously altering a hysteretic threshold value used by the hysteretic current controller according to the fixed frequency function to provide for fixed frequency operation of the supply, and
    supplying the result of the subtraction between the integrations to the hysteretic current controller.

* * * * *